…

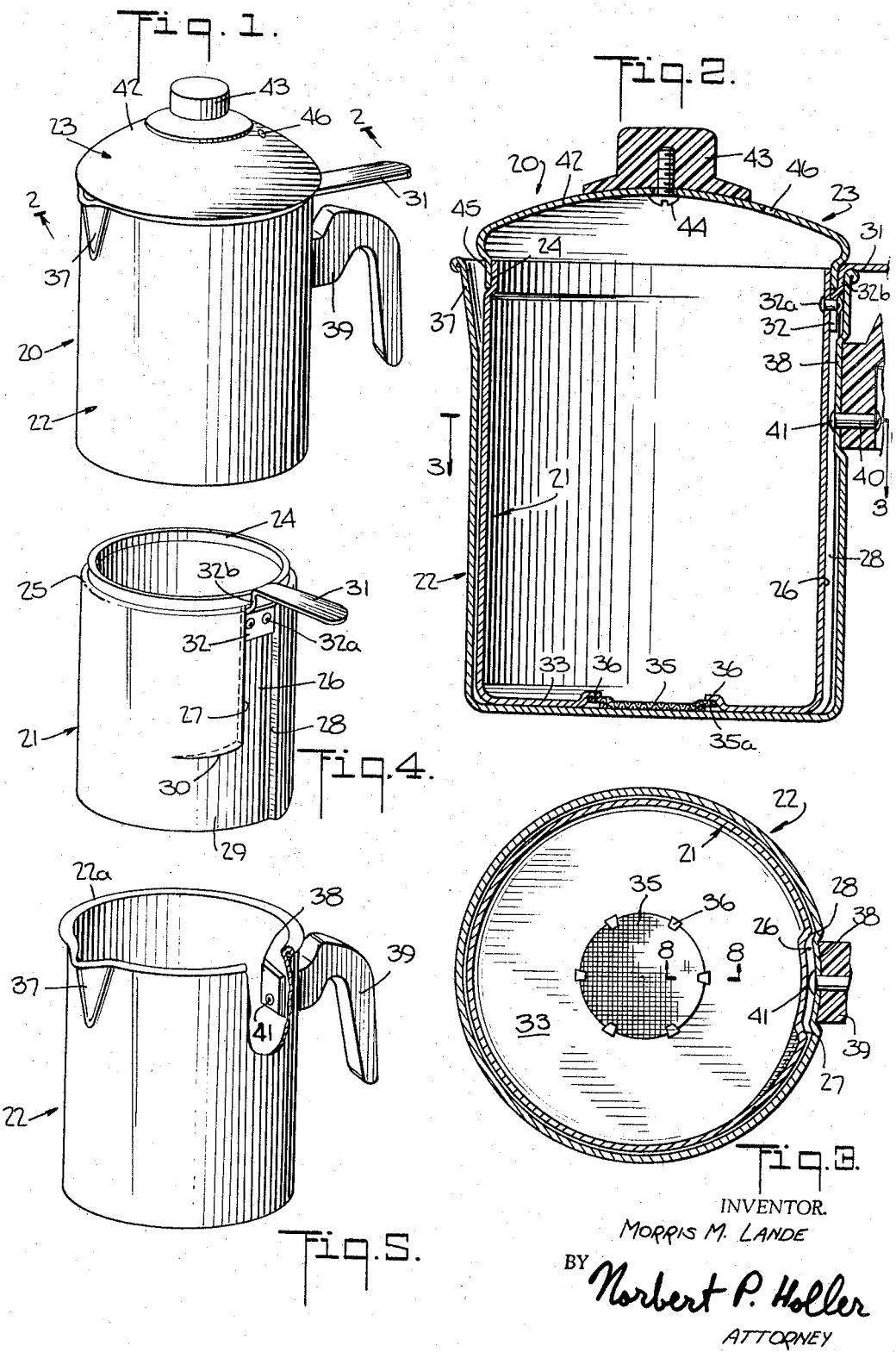

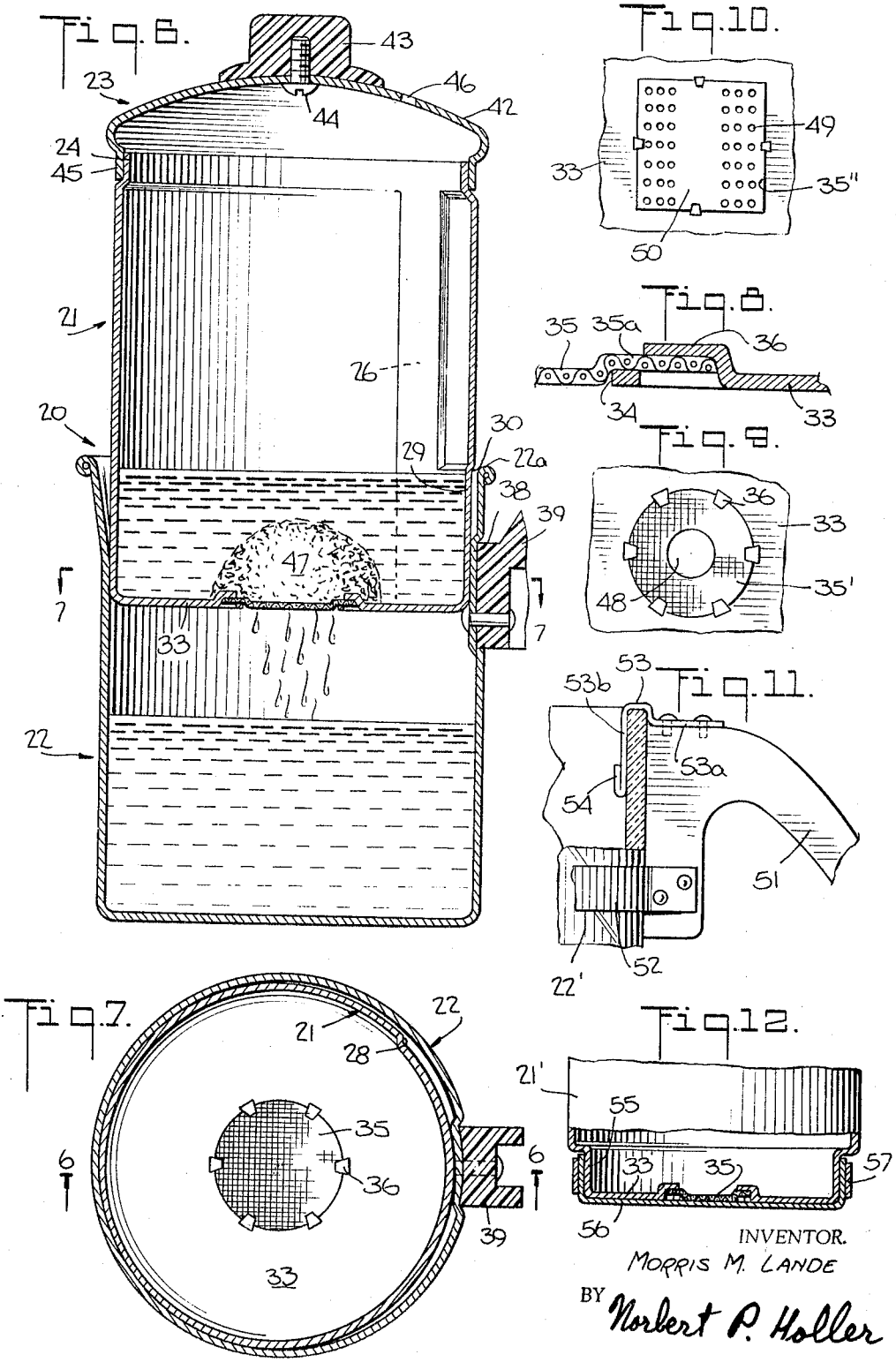

United States Patent Office 3,304,852
Patented Feb. 21, 1967

3,304,852
BEVERAGE MAKING APPARATUS
Morris M. Lande, 601 W. 110th St.,
New York, N.Y. 10025
Continuation of application Ser. No. 339,466, Jan. 22, 1964. This application May 31, 1966, Ser. No. 559,665
10 Claims. (Cl. 99—319)

The instant application is a continuation of my prior application Serial No. 339,466, filed January 22, 1964, and now abandoned.

This invention relates generally to beverage making apparatus and in particular to domestic beverage makers arranged for preparation of the beverage by a steeping action.

In the past, beverage making devices have been developed in a wide gamut of designs and configurations, ranging from a single open pan to complex electro-mechanical arrangements. Regardless of their construction, however, a rather common problem with the prior art beverage makers has been the maximization of flavor and clarity in the finished beverage.

An important object of the present invention, therefore, is to provide beverage making apparatus in which an intimate contact between the solid and liquid ingredients at a temperature very close to boiling may be achieved to maximize the flavor of the resultant beverage.

A related object of the present invention is to provide new and improved beverage making devices which are both highly efficient in operation and inexpensive to manufacture.

Another object of the present invention is to provide beverage makers of simple, compact construction employing a one-piece internal unit which is easy to handle and clean.

Still another object of the present invention is to provide beverage making devices which permit the preparation of either large or small quantities of the beverage.

A more specific object of the present invention is the provision of coffee makers in which substantially the entire quantity of the hot water and ground coffee are combined and maintained in the form of a slurry throughout the brewing period for maximized infusion.

A further object of the present invention is the provision of such coffee makers wherein the entire slurry during the steeping and brewing period is maintained at a maximum near-boiling temperature.

Generally speaking, a device according to the present invention comprises outer and inner cylindrical vessels the latter of which has its bottom provided with a perforated portion through which a flow of the liquid portion of the brew is permitted while passage of the particulate or solid portion is inhibited. The inner vessel may be fully telecoped down into and raised out of the outer one with a straight-line motion assured by the provision of a vertical groove or channel on the outer surface of the former and a cooperating mated projection on the inner surface of the latter. Means are also provided for selectively retaining and locking the inner vessel in an elevated position at the top end of the outer vessel, such means comprising a non-circular portion of the outer surface of the inner vessel extending from the bottom end of the channel to one side thereof and the aforesaid projection on the inner surface of the outer vessel. The said surface portion and the upper part of the projection are designed to coact in a cam-like fashion for effecting in response to a limited rotation of the inner vessel relative to the outer one a smooth friction tightening of the former in the said elevated position thereof, while an adjunct of the projection engages under the inner vessel and additionally supports the same. The inner diameter of the outer vessel is slightly greater than the outer diameter of the inner vessel at all other points of their peripheries. Thus, when the water in the outer vessel is boiled, alignment of the said channel and projection enables the inner vessel containing the solid ingredient of the brew to descend slowly and linearly down into the outer vessel, at which time the water is displaced from the latter into the inner vessel through the perforations in the bottom of the inner vessel. When at a later point in the brewing period, the inner vessel is raised and locked in its elevated position as aforesaid, the liquid brew can then filter through the said performations and the solid material settled thereover back into the outer vessel from which it is ultimately to be dispensed.

The foregoing and other objects, characteristics and advantages of the present invention will be more clearly understood from the following detailed description thereof when read in conjunction with the accompanying drawings, wherein:

FIG. 1 is a perspective view of an assembled beverage maker constructed in accordance with the principles of the present invention, and shows the same with the inner vessel fully telescoped into the outer vessel;

FIG. 2 is an enlarged sectional view taken along line 2—2 in FIG. 1;

FIG. 3 is a sectional view taken along the line 3—3 in FIG. 2;

FIG. 4 is a perspective view of the inner vessel or extractor of the beverage maker of FIG. 1;

FIG. 5 is a perspective view of the outer vessel of the beverage maker of FIG. 1;

FIG. 6 is a sectional view taken along the line 6—6 in FIG. 7 and shows the beverage maker with the inner vessel in its raised and locked position;

FIG. 7 is a sectional view taken along the line 7—7 in FIG. 6;

FIG. 8 is a fragmentary, enlarged sectional view taken along the line 8—8 in FIG. 3;

FIGS. 9 and 10 are plan views of two modified forms of perforation means for the bottom of the inner vessel;

FIG. 11 is a fragmentary side elevational view of a modified form of outer vessel for a beverage maker according to the present invention; and FIG. 12 is a fragmentary, partly sectional, elevational view of a modified form of inner vessel for a beverage maker according to the present invention.

Referring now in greater detail to FIGS. 1 to 5 of the drawings, the beverage making device 20 according to one aspect of the present invention comprises a generally cylindrical inner vessel or extractor 21, a generally cylindrical outer vessel 22 and a cover or lid 23. Except as hereinafter indicated, the outer diameter of the inner vessel is slightly less than the inner diameter of the outer vessel to facilitate smooth sliding movement of the former within the latter. The cover 23, as will be more fully explained presently, sits atop the inner vessel 21.

The inner vessel 21 is open at the top and its uppermost rim 24 is offset radially inwardly to define an outer peripheral shoulder 25. On its outer surface, the vessel 21, which is preferably made of aluminum or stainless steel, is provided with a vertical channel 26 of substantially the same depth as the degree of offset of the rim 24. The channel 26 is defined between two parallel shoulders 27 and 28 of which only the latter extends fully to the bottom end of the vessel 21. The shoulder 27 is terminated somewhat short of the bottom of the vessel by virtue of the fact that the wall of the latter is non-circularly curved for a short distance to one side of the channel 26, presenting a surface portion 29 along which the outer diameter of the vessel 21 increases gradually and smoothly from the reduced value of the bottom of the channel to the full value of the body of the vessel. The upper boundary of the surface portion 29 thus is defined by a gradually disappearing, horizontal, downwardly facing shoulder 30 which functions as a visual indicator in a manner and for a purpose also to be more fully explained hereinafter.

The inner vessel is further provided with a handle 31, a downwardly bent lug 32 of which is secured, as by means of rivets 32a, to the outer surface of the vessel 21 at the upper end of the channel 26. The said lug 32 is laterally offset somewhat so as to have its upper portion 32b spaced from the adjacent part of the rim 24.

The bottom 33 of the inner vessel 21 is preferably imperforate except for a central hole or opening 34 (see FIG. 8) which is covered by a mesh or screen element 35 having a deflected center portion which fits into the hole or opening 34. The element 35 has a peripheral annular flange 35a which is adapted to overlie the portion of the upper surface of the bottom 33 bounding the opening 34, the element 35 being held in place by tabs 36 struck up from the bottom of the vessel and pressed down over the flange 35a of the element 35.

The outer vessel 22 is imperforate throughout and also open at the top, being provided at one side with a spout portion 37. Diametrically opposite the spout 37, the outer vessel 22 is provided on its inner surface with a projection 38 which may be integral with the wall of the vessel or a separate structure affixed thereto. In the illustrated embodiment of the invention, the projection 38 comprises a substantially rectangular, radially inwardly protruding formation defined by a corresponding indentation of the outer surface of the outer vessel where the handle 39 is affixed by means of a rivet 40. The flat head 41 of the rivet protrudes beyond the face of the projection 38. As clearly apparent from FIGS. 2 and 3, the width of the projection 38 and the combined radial depth of the said projection and the rivet head 41 are such that the entire step-like formation constituted by these elements is adapted slidably to be received in the channel 26 of the inner vessel 21 when the latter is oriented so as to dispose the channel in vertical alignment with the projection 38.

In the so far described embodiment of the invention, the step formation 38–41 is employed as a part of the means for supporting and locking the inner vessel 21 in an elevated position within the outer vessel 22. Referring particularly to FIGS. 6 and 7, the height of the shoulder 30 of the surface portion 29 from the bottom 33 of the inner vessel 21 is such that when the said shoulder can just be seen above the top edge or lip 22a of the outer vessel 22, the top edge of the lower portion of the step formation 38–41, i.e. of the rivet head 41, is disposed in a plane just below the plane of the bottom 33 of the inner vessel 21. The upper portion of the step formation 38–41, i.e. the projection 38, can then be brought into face to face engagement with the surface 29 by an appropriate rotation of the inner vessel 21, i.e. counterclockwise as seen in FIG. 3, whereby the cam-like interaction between the said surface 29 and the step formation part 38 causes the vessel 21 to be pressed against the opposed inner surface of the outer vessel 22 so as to be in close, tight contact therewith and frictionally tightened to the outer vessel. At the same time, the step formation part 41 engages the undersurface of the bottom 33 of the inner vessel and provides an additional support for holding the inner vessel up in its elevated position within the outer vessel.

As shown in FIGS. 1, 2 and 6, the cover 23 includes a dome-shaped portion 42 to which a knob 43 is affixed by a screw 44. The cover further includes a cylindrical skirt 45 which depends from the dome-shaped portion and the thickness and diameter of which are such that it can rest on the shoulder 25 and fit snugly both about the inwardly offset top rim 24 of the inner vessel 21 and into the space between said rim and the offset handle lug portion 32b. It will be understood, of course, that the lug 32 need not be provided with such an offset portion. In such a case, however, a cut-out section or recess (not shown) would have to be provided in the skirt 45 for accommodating the handle 31. If desired, a vent hole 46 may be drilled or punched or otherwise provided in the dome-shaped portion 42 of the cover to prevent any excessive build-up of steam pressure within the device 20.

The operation of the beverage making device according to the present invention will now be described specifically in connection with the preparation of a quantity of coffee, but it should be remembered that the device according to this invention may also be used in the making of such diverse beverages as tea, cocoa and the like.

First, a suitable quantity of water is poured into the outer vessel 22 which is then placed upon a stove or other heating unit (not shown) and brought to boiling condition. The quantity of water will, of course, correspond to the amount of coffee which it is desired to prepare, and thus any amount of coffee (or other beverage) can be prepared, ranging from a single cupful to the total usable volume of the beverage maker. Although the empty inner vessel 21 could be telescoped partially or fully into the outer vessel during this boiling period, it may just as well be entirely removed from the outer vessel, with the cover 23 being placed atop the latter. Concurrently, a suitable quantity of ground coffee is placed into the inner vessel.

When the water has been brought to a boil, the inner vessel is superposed onto the outer vessel, with their respective handles 21 and 39 in vertical alignment with each other. By virtue of its attachment to the inner vessel at the top end of the channel 26, the handle 31 thus also serves as a marker to indicate and ensure corresponding alignment of the channel 26 and the step formation 38–41. The heat at this point is turned off or down very low, and the inner vessel 21, with the cover 23 now supported thereon as shown, is then released and begins to sink downwardly into the outer vessel 22 as the heated water is displaced from the latter into the inner vessel through the perforated portion 35 in the bottom 33 of the inner vessel. In this manner, the coffee grains in the inner vessel are agitated and a slurry or suspension-like mixture of the water and coffee grains is formed as a concomitant of the sinking of the inner vessel to its lowermost or fully telescopsed position.

It will be appreciated that despite the fact that the heat has been turned very low or shut off, the slurry or mixture is being subjected to maximum near-boiling temperatures without actually boiling. When the inner vessel reaches its lowest position (FIG. 2), the center perforated flat bottom thereof sits flush against the flat bottom of the outer vessel. The slurry or mixture being thus sealed off and isolated in the inner vessel, the mixture is allowed to stand and steep for one or two minutes. Thereafter the entire device is removed from the heater unit.

The coffee mixture in the inner vessel is now stirred with a spoon or the like in a rotary manner to create a whirlpool or vortex effect within the mixture, thereby to cause the particles to settle in the form of a mound on the center perforated portion of the bottom of the inner vessel. During this settling, the larger particles, being heavier, will normally settle out first, so that the smaller and lighter particles will settle atop a layer of coarser particles. This action, which is completed about a minute or so after the stirring action is terminated, provides a self-filtering bed of coffee particles serving to minimize the quantity of grounds that can pass through the perforated bottom.

The inner vessel is now raised with a smooth lifting action until the shoulder 30, serving as a guide line, becomes just visible above the top edge 22a of the outer vessel. The inner vessel is then turned a short distance about its axis (see FIGS. 6 and 7), so as to move the cam surface 29 past the step formation 38–41, until the part 38 of the formation becomes effective to displace the inner vessel toward and press it against the spout-side inner surface of the outer vessel. This operates, therefore, to frictionally tighten the inner vessel in its elevated position, which result is achieved in a smooth non-jarring manner so as to prevent the previously formed filter bed from being upset or disturbed. Concurrently, as previously described, the location of the part 41 of the step formation beneath the bottom 33 of the inner vessel provides an additional stop or support for holding the inner vessel up in its elevated position within the outer vessel.

As clearly apparent from FIG. 6, with the inner vessel so positioned, the liquid part of the brew drains out of the inner vessel through the filter bed 47 and the perforated portion or screen 35 into the outer vessel. Once this flow is completed, the inner vessel containing the used coffee grounds is removed, and the outer vessel then remains as a convenient serving unit for the finished coffee (or other beverage).

It is important to observe that the perforated bottom portion 35 encompasses only a small part of the total bottom area, and is advantageously situated centrally of the bottom of the inner vessel. By virtue of this arrangement, the perforated portion serves to reduce the speed of filtration and directs the liquid toward a restricted center outflow, the liquid thereby passing through a greater quantity of particles for maximum flavor extraction and with a concomitant reduction in the amount of sediment or fine particles passing through the filter into the finished beverage. At the same time, the whirlpool or vortex effect developed in the liquid by manual stirring causes the coffee particles to be deposited in the center of the vessel overlying the perforated portion 35, where they act, as previously indicated, as a filter bed for the successful exclusion of sediment.

It is important also to observe that the cover 23 is positioned atop the inner vessel 21, with the skirt portion 45 of the cover in embracing relationship to the inwardly offset flange 24 of the inner vessel, and with the bottom edge of the skirt portion resting on the shoulder 25, whereby the cover is secure against accidentally toppling off the inner vessel. Advantageously the cover adds its weight to the inner vessel or extractor as the latter sinks down into the outer vessel, whereby the rate of sinking movement is increased. Moreover, as the extractor reaches its lowermost position, the skirt portion of the cover is received in the space between the flange 24 and the top rim 22a of the outer vessel 22 so as to sit snugly atop the entire unit. This takes place automatically and without requiring any handling or supervision.

It is further important to observe that by virtue of the fact that the side walls of both vessels are, except in the region of the surface portion 29, straight and parallel and dimensioned to be in close sliding proximity to one another, the relative movement of the vessels into and out of the fully telescoped position of the vessels is precisely linear and achieved without shocks or jarring, while concomitantly the inner vessel performs a piston-like function during its linear descent through the outer vessel so as to ensure that substantially all of the water initially in the outer vessel, except for a relatively insignificant amount remaining between the side walls, is fully displaced into the inner vessel. The aforesaid straight-sidedness of the two vessels also ensures that when the inner vessel is rotated at the elevated position of FIG. 6 relative to the outer vessel and is thereby pressed smoothly and without jarring laterally against the portion of the inner surface of the outer vessel opposite the step formation 38–41, the contact between the vessels at that location will not only be a full surface contact to effect a secure locking of the inner vessel to the outer one in a firm upright position, but will also be such as to maintain the respective contact surfaces substantially smooth and unmarred.

In the embodiment of the invention so far described, the perforated portion is preferably about 1½ inches in diameter and may be constituted either by a screen element 35 as shown or by a correspondingly shaped disc having a plurality of small holes punched or otherwise formed therein and distributed over the active filtering portion of its expanse.

In accordance with another aspect of the present invention, the perforated bottom portion of the inner vessel may be a screen element 35' (see FIG. 9) which is essentially the same as the element 35 illustrated in FIGS. 2, 3 and 6 to 8 except for the presence of a small imperforate region 48 at its center, this region being approximately ¼ to ⅜ inch in diameter. In the case where the element 35' is a screen structure, the region 48 may be defined by a separate disc or plate element suitably secured to the upper surface of the screen. If, on the other hand, the element 35' is a metal disc having holes punched thereinto, the imperforate center portion 48 may be defined either by securing such a separate plate element to the disc or by providing the holes in the latter throughout the entire active filtering expanse thereof except for the central region 48.

The presence of such an imperforate region tends to improve the action of the filter element. Thus, during the vortex motion the particles whirl around in circular paths at various distances from the vortex but tend to remain essentially stationary at the center of the vortex. This tends to permit some of the sediment to remain at the center of the screen element and, in the absence of the imperforate region, to pass through the element into the beverage in the outer vessel. In the presence of the imperforate center region 48, however, substantially all of the said stationary sediment remains where it is atop the said imperforate region and cannot pass through the filter, since to reach the perforated region thereof these particles would have to first filter laterally through the larger particles constituting the base of the mound or filter bed 47.

It will be understood that the filter element or perforated bottom portion need not be circular in outline but may be square or rectangular, for example. Thus, in FIG. 10 the perforated portion 35'' is shown as a square plate element having a plurality of holes 49 punched therein throughout its expanse except for a central imperforate strip-like region 50. In terms of function, the region 50 serves the same purpose as the circular imperforate region 48 in the filter element 35' illustrated in FIG. 9. The filter element 35'' may also be in the form of a wire mesh screen to which a small, separate, imperforate strip is secured. By the same token, a circular filter element such as 35' may be provided with a diametrically extending strip, such as 50, in lieu of the imperforate disc element 48, while conversely a square or rectangular element such as 35'' may be provided with a smaller, circular imperforate region, such as 48, at its center.

Where, by way of contrast to the beverage making device of FIGS. 1 to 7 in which the outer vessel is metallic, it is desired to employ an outer vessel made of glass, it is found to be impractical to provide a step formation such as that designated 38–41 in FIGS. 1 to 7. As clearly shown in FIG. 11, the handle 51 for such a glass vessel 22' is generally secured to the latter by means of an encircling metal strap 52 normally received in a circumferential channel or below a circumferential ridge provided on the outer surface of the vessel. For this type of beverage making device it is contemplated by the present invention, therefore, to provide in place of the projection 38 and rivet head 41 a step formation which is secured to a part of the handle. In the construction of FIG. 11, it can be seen that the step formation is defined by a metal strip 53 one end portion 53a of which is bolted or riveted to the top of the handle 51, and the other end portion 53b of which is bent down over the top edge of the vessel 22', the terminal section 54 of the portion 53b being bent upwardly so as to lie close to the downwardly extending portion 53b. It will be recognized that in this arrangement, the uppermost region of the portion 53b constitutes the part of the formation designed for engagement with the cam surface portion 29 of the inner vessel, while the bent up member 54 constitutes the part of the formation designed for engagement with the underside of the bottom of the inner vessel (not shown in FIG. 11) to provide the rest stop therefor.

Further in accordance with the present invention, the inner vessel may be somewhat modified to provide for the use of an auxiliary and removable external filter member. As shown in FIG. 12, the inner vessel 21' is provided at its bottom end with a reduced diameter extension 55 the bottom of which constitutes the bottom 33 of the vessel and contains the central perforated portion or filter element 35 (or 35' or 35''). Extended over the undersurface of the bottom of the extension 55 is a cloth filter 56 the marginal region of which is passed up around the said extension 55, to which it is secured by means of a clamping ring or band 57 extended thereabout. In this arrangement, the cloth filter, being generally much finer than the perforated portion of the bottom 33, aids in preventing the passage of any of the coffee grounds or any other sediment, which might have gotten through the element 35, into the lower vessel. As will be readily appreciated, the cloth filter can be easily removed and cleaned or replaced at will. The cam surface portion 29 on the inner vessel 21' is, of course, formed on the body of the latter just above the reduced diameter portion 55.

The rotation-inhibiting mating of the outer cross-sectional contours of the inner vessel to the inner cross-sectional contours of the outer vessel may be achieved by other constructions, for example by making the vessels oval in outline in lieu of providing the illustrated channel and projection means. In such an arrangement, the upper edge region or rim of the outer vessel would be offset outwardly somewhat to define a fully or partly peripherally extending ledge or shelf on which the bottom of the inner vessel could be seated when the latter is raised to an elevated position and rotated through a short arc to bring the lower end region of its outer surface up against the inner surface of the said offset rim of the outer vessel.

It will be understood that the foregoing description of preferred aspects of the present invention is intended to be illustrative only, and that the disclosed structures and structural/functional relationships are susceptible to a number of changes, modifications and variations none of which involves any departure from the spirit and scope of the present invention as defined in the hereto appended claims.

Having thus described my invention, what I claim and desire to secure by Letters Patent is:

1. A beverage making device, comprising an outer vessel having an open top and an imperforate bottom and adapted to contain a quantity of a beverage-making liquid, an inner vessel having a rigid bottom provided substantially in the plane thereof with a perforated central portion within its otherwise imperforate expanse and adapted to contain a quantity of a comminuted solid beverage-making substance, the inner cross-sectional contours of said outer vessel being mated to the outer cross-sectional contours of said inner vessel for guiding the latter for sliding inward and outward telescoping movement relative to said outer vessel, and cooperable means on said inner and outer vessels adapted to be rendered active upon an outward telescoping movement of said inner vessel to an elevated position within said outer vessel and a subsequent rotary movement of the former relative to the latter for retaining and tightening said inner vessel in said elevated position, whereby during such inward telescoping relative movement of said vessels said liquid is displaced from said outer vessel into said inner vessel through said perforated bottom portion of the latter to become admixed with said solid substance, the latter upon an imparted vortical flow of said liquid settling as a self-building filter bed centrally atop said bottom over said perforated portion, while upon an outward telescoping movement of said inner vessel to and retention thereof at said elevated position within said outer vessel the finished liquid beverage is permitted to filter from said inner vessel through said perforated portion thereof and said bed of solid substance into said outer vessel.

2. A beverage making device according to claim 1, said perforated central portion of said bottom having a medial imperforate region.

3. A beverage making device according to claim 1, said cooperable means comprising a step formation on the inner surface of said outer vessel, the radial height of the lower part of said step formation being slightly greater than that of the upper part thereof, said inner vessel being provided at its outer surface with a longitudinal channel extending substantially from the top to the bottom of said inner vessel, said inner vessel being further provided with an outer cam surface portion contiguous with said channel at the lower end region thereof and extending laterally from said channel for a predetermining short distance along the periphery of said inner vessel, said inner vessel over the length of said cam surface portion having a varying outer diameter which increases gradually from the reduced outer diameter of said inner vessel at the bottom of said channel to the full outer diameter of said inner vessel, the radial height of said lower part of said step formation being slightly less than the depth of said channel on the outer surface of said inner vessel, whereby said channel and said step formation when aligned with one another serve as guide means to permit non-rotary telescoping sliding relative movement between said vessels, while when said vessel is extracted a predetermined amount from its most telescoped position within said outer vessel, a relative rotation therebetween brings said upper part of said step formation into engagement with said outer surface portion to cam and press said inner vessel against the opposite portion of the inner surface of said outer vessel so as to frictionally tighten the former in an elevated position within the latter, and simultaneously brings said lower part of said step formation underneath said bottom of said inner vessel to act as an additional stop for the latter.

4. A beverage making device, comprising an outer vessel of oval cross-section having an open top and an imperforate bottom and adapted to contain a quantity of a beverage-making liquid, an inner vessel of oval cross-section having a rigid bottom provided substantially in the plane thereof with a perforated central portion within its otherwise imperforate expanse and adapted to contain a quantity of a comminuted solid beverage-making substance, the inner cross-sectional dimensions of said outer vessel being mated to the outer cross-sectional dimensions of said inner vessel for guiding the latter for non-rotary sliding inward and outward telescoping movement relative to said outer vessel, whereby during such inward telescoping relative movement of said vessels said liquid is displaced from said outer vessel into said inner vessel through said perforated bottom portion of the latter to become admixed with said solid substance, the latter upon an imparted vortical flow of said liquid settling as a self-building filter bed centrally of said bottom over said perforated portion, and the uppermost rim of said outer vessel being offset outwardly to define inwardly of said rim an upwardly facing ledge engageable with the marginal region of the outside bottom surface of said inner vessel, whereby upon rotary displacement of said inner vessel relative to said outer vessel, subsequent to an outward telescoping movement of the former to an elevated position within the latter, said inner vessel is retained in said elevated position thereof by resting on said ledge and against said rim, thereby to permit the finished liquid beverage to filter from said inner vessel through said perforated portion thereof and said bed of solid substance into said outer vessel.

5. A beverage making device according to claim 4, said perforated central portion of said bottom having a medial imperforate region.

6. A beverage making device, comprising inner and outer cylindrical vessels of approximately the same height and each having an open top and a rigid plane bottom, said bottom of said inner vessel being provided substantially in the plane thereof with a perforated central portion within its otherwise imperforate expanse, said bottom of said outer vessel being imperforate, the outer diameter of said inner vessel being slightly less than the inner diameter of said outer vessel to enable the former to be slidably received within the latter, said inner vessel being adapted to contain a quantity of a comminuted solid beverage-making substance and being provided at its outer surface with a longitudinal channel extending substantially from the top to the bottom of said inner vessel, said inner vessel being further provided with an outer cam surface portion contiguous with said channel at the lower end region thereof and extending laterally from said channel for a predetermined short distance along the periphery of said inner vessel, said inner vessel over the length of said cam surface portion having a varying outer diameter which increases gradually from the reduced outer diameter of said inner vessel at the bottom of said channel to the full outer diameter of said inner vessel, and said outer vessel being adapted to contain a quantity of a beverage-making liquid and being provided on its inner surface and adjacent its top edge with a protruding formation the radial height of which is slightly less than the depth of said channel on the outer surface of said inner vessel, whereby said channel and said formation when aligned with one another serve as guide means to permit non-rotary telescoping sliding relative movement between said vessels, so that when said inner vessel is lowered said liquid enters the same to become admixed with said solid substance, and the latter upon an imparted vortical flow of said liquid settling as a self-building filter bed centrally over said perforated portion, while when said inner vessel is extracted a predetermined amount from its most telescoped position within said outer vessel, they may be rotated relative to one another to bring said formation and said outer surface portion into engagement with each other to cam and press said inner vessel against the portion of the inner surface of said outer vessel opposite said formation so as to frictionally tighten said inner vessel in an elevated position within said outer vessel while finished liquid beverage filters through said bed of solid substance into said outer vessel.

7. A beverage making device according to claim 6, said protruding formation comprising a step formation the radial height of the lower part of which is slightly greater than that of the upper part thereof and slightly less than the depth of said channel on the outer surface of said inner vessel, whereby said channel and said step formation when aligned with one another serve as said guide means to permit non-rotary telescoping sliding relative movement between said vessels, while when said inner vessel is extracted a predetermined amount from its most telescoped position within said outer vessel, a relative rotation therebetween brings said upper part of said step formation into engagement with said outer surface portion to cam and press said inner vessel against the opposite portion of the inner surface of said outer vessel so as to frictionally tighten the former in an elevated position within the latter, and simultaneously brings said lower part of said step formation underneath said bottom of said inner vessel to act as an additional stop for the latter.

8. A beverage making device according to claim 7, further comprising a cover having a downwardly depending cylindrical skirt portion the outer diameter of which is slightly less than the inner diameter of said outer vessel, and said inner vessel having the top edge region thereof offset radially inwardly to an outer diameter slightly less than the inner diameter of said skirt portion, whereby the latter, when said cover is seated atop said inner vessel in embracing relation to said top edge region thereof, may be received within the upper confines of said outer vessel in the fully telescoped position of said vessels.

9. A beverage making device according to claim 7, further comprising a handle secured to said outer vessel by means of a rivet, a portion of the side wall of said outer vessel being radially inwardly displaced adjacent said top edge thereof to provide an indentation on its outer surface defining the attachment location of said handle and a corresponding projection on its inner surface, said rivet extending through said side wall portion in the lower region thereof and having a head protruding therebeyond inwardly of said outer vessel, whereby said rivet head constitutes the said lower part of said step formation while the upper region of said projection constitutes the said upper part of said step formation, and said cam surface portion of said inner vessel being bounded by a downwardly facing shoulder which serves as a guide line to indicate, when just visible over said top edge of said outer vessel, the location of said inner vessel in said elevated position thereof suitable for rotary relative movement between said vessels.

10. A beverage making device according to claim 7, further comprising a handle secured to said outer vessel at the outer surface of the latter, and a rigid strip secured to said handle and extending into said outer vessel over said top edge thereof, said strip having a first part bent down flush against the inner surface of said outer vessel for a predetermined relatively short distance from said top edge and having a second part contiguous with the lowermost end of said first part and bent upwardly so as to overlie the lowermost end region of said first part, whereby said second part of said strip constitutes the said lower part of said step formation while the upper region of said first part of said strip constitutes the said upper part of said step formation, and said cam surface portion of said inner vessel being bounded by a downwardly facing shoulder which serves to indicate, when just visible over said top edge of said outer vessel, the location of said inner vessel in said elevated position thereof suitable for rotary relative movement between said vessels.

References Cited by the Examiner

UNITED STATES PATENTS

| | | | |
|---|---|---|---|
| 444,572 | 1/1891 | Williams | 99—319 |
| 659,150 | 10/1900 | King | 220—40X |
| 708,544 | 9/1902 | Guenzel | 210—467 |
| 875,509 | 12/1907 | Ellis | 99—319 |
| 1,238,688 | 8/1917 | Kinkel | 99—412 |
| 1,347,142 | 7/1920 | Biette | 99—319X |
| 1,400,214 | 12/1921 | Galt | 99—319 |
| 1,643,309 | 9/1927 | McClure | 99—319 |
| 1,761,354 | 6/1930 | McClure | 99—319X |
| 1,982,846 | 12/1934 | Wales | 99—319X |
| 2,400,613 | 5/1946 | Strahm | 99—412X |

FOREIGN PATENTS 17,057    7/1907    Great Britain.

IRVING BUNEVICH, *Primary Examiner.*
WALTER A. SCHEEL, *Examiner.*
S. P. FISHER, *Assistant Examiner.*